No. 658,442. Patented Sept. 25, 1900.
D. HITCHCOCK.
MUD GUARD FOR VEHICLES.
(Application filed Mar. 13, 1900.)
(No Model.)
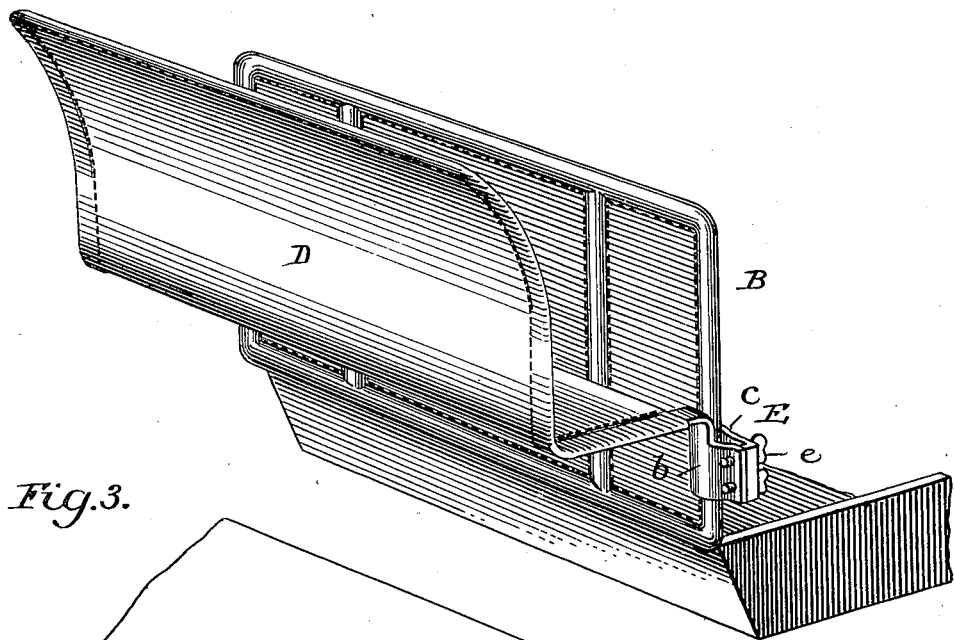
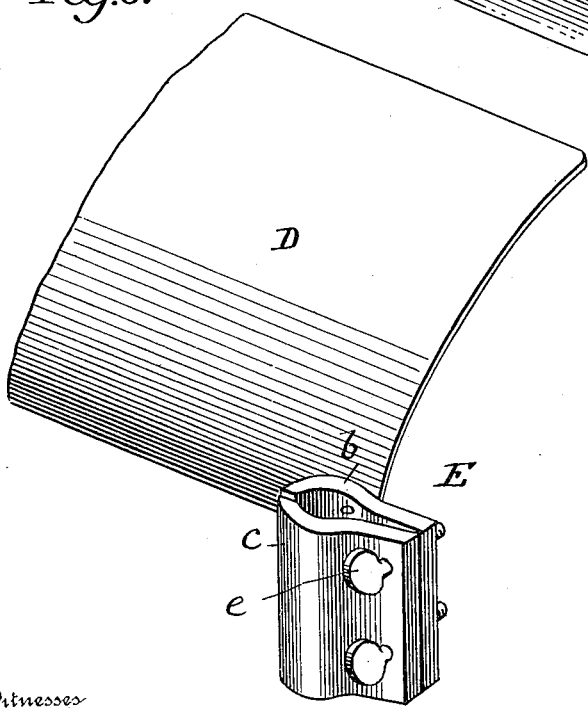
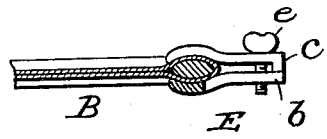
Witnesses
Inventor
Dexter Hitchcock
by Foster & Freeman
Attorneys

UNITED STATES PATENT OFFICE.

DEXTER HITCHCOCK, OF NORWALK, CONNECTICUT.

MUD-GUARD FOR VEHICLES.

SPECIFICATION forming part of Letters Patent No. 658,442, dated September 25, 1900.

Application filed March 13, 1900. Serial No. 8,475. (No model.)

*To all whom it may concern:*

Be it known that I, DEXTER HITCHCOCK, a citizen of the United States, residing at Norwalk, in the county of Fairfield and State of Connecticut, have invented certain new and useful Improvements in Mud-Guards, of which the following is a specification.

My invention is an attachment for vehicles; and it consists of a guard arranged outside of the dashboard for the purpose of guarding the occupants of the vehicle from stones, mud, &c., thrown up by the fore feet of the horse, as fully set forth hereinafter and as illustrated in the accompanying drawings, in which—

Figure 1 is a view illustrating the dashboard of a vehicle with the guard attached thereto. Fig. 2 is a sectional view illustrating the construction and arrangement of the clamp upon the dashboard; Fig. 3, a perspective view illustrating a different form of guard.

The dashboard B is of usual character and of any form or width.

In front of the dashboard B, attached to its sides or vertical lines in such manner that it may be raised or lowered on those sides or vertical lines, is my improved attachment D, constituting a guard of any suitable construction, so arranged and adjusted that it is impossible for the material thrown up by the fore feet of the animal to pass the attachment D. For this purpose it is desirable that the guard shall be adjustable, so that it may be arranged in a higher or lower position, according to the height of the horse. This object is obtained by any desired means of attachment which enables it to be raised or lowered as desired. The guard may be constructed in different ways and adjustably connected in different ways in front of the dashboard B. It may be made of metal or of a covered metallic frame. Preferably this frame is of thin soft metal, so that the sides may be bent inward to attach to dashboards of somewhat varying widths. The slack in the cover thus made will be at the lower part, where it is concealed by the dashboard B and will hardly appear; also, it may be bent into an upright or into an oblique position and so set at different angles to the dashboard B, thus bringing the superior line nearer or farther from the horse, as desired. The nearer the horse the lower it may be placed and still intercept missiles thrown upward and backward by the forward feet of the animal.

The securing device may be in the form of clamps E, each consisting of two parts $b$ $c$, the part $b$ constituting a plate, forged or otherwise secured to one of the side bars of the frame of the guard, and these two pieces may be clamped against the intermediate side or vertical rail of the dashboard by means of bolts or a clamping-screw $e$. This permits an easy removal or change in position of the fender D and at the same time secures a firm and durable attachment without marring the dashboard B.

Without limiting myself to the precise construction and arrangement of parts shown I claim as my invention—

1. The combination with the dashboard of a vehicle, of a mud-guard, and devices secured to the lower edge of the guard and adjustably clamped to the side edges of the dashboard, and the said guard projecting bodily in front of the dashboard with its lower edge below the top edge of the dashboard, substantially as set forth.

2. The combination with the dashboard of a vehicle, of a guard, and devices secured to the guard and clamping the side edges of the dashboard, the lower edge of said guard being below the top edge of the dashboard and its upper edge projecting forward in advance of the lower edge, substantially as set forth.

3. The combination with the dashboard of a vehicle, of a guard secured to the dashboard and projecting bodily in front thereof, said guard having a frame of flexible metal whereby it may be bent to vary its position relatively to the dashboard, substantially as set forth.

In testimony whereof I have signed my name to this specification in the presence of two subscribing witnesses.

DEXTER HITCHCOCK.

Witnesses:
WM. A. CURTIS,
H. T. SHEFFIELD.